United States Patent [19]
Sato et al.

[11] Patent Number: 5,638,210
[45] Date of Patent: Jun. 10, 1997

[54] ZOOM LENS HAVING A VIBRATION CORRECTING OPTICAL SYSTEM

[75] Inventors: Susumu Sato, Chiba; Atsushi Shibayama, Kawasaki, both of Japan

[73] Assignee: Nikon Corporation, Tokyo, Japan

[21] Appl. No.: 208,821

[22] Filed: Mar. 11, 1994

[30] Foreign Application Priority Data

Mar. 13, 1993 [JP] Japan .................. 5-079144

[51] Int. Cl.⁶ .................. G02B 27/64; G02B 15/14
[52] U.S. Cl. .................. 359/557; 359/676; 359/689
[58] Field of Search .................. 359/554–557, 359/676, 677, 684, 685, 689–690, 791

[56] References Cited

U.S. PATENT DOCUMENTS

| | | | |
|---|---|---|---|
| 4,907,868 | 3/1990 | Kitagishi et al. | 359/557 |
| 4,974,950 | 12/1990 | Yamazaki et al. | 359/557 |
| 4,978,205 | 12/1990 | Sato | 359/557 |
| 5,000,549 | 3/1991 | Yamazaki | 359/557 |
| 5,002,373 | 3/1991 | Yamahashi | 359/684 |
| 5,040,881 | 8/1991 | Tsuji | 359/557 |
| 5,069,536 | 12/1991 | Ogata | 359/791 |
| 5,069,537 | 12/1991 | Kitagishi et al. | 359/557 |
| 5,121,978 | 6/1992 | Maruyama | 359/557 |
| 5,249,079 | 9/1993 | Umeda | 359/557 |
| 5,267,084 | 11/1993 | Nozawa | 359/683 |
| 5,530,593 | 6/1996 | Shibayama et al. | 359/557 |

*Primary Examiner*—Thong Nguyen
*Attorney, Agent, or Firm*—Shapiro and Shapiro

[57] ABSTRACT

A zoom lens has an optical axis and at least three lens groups arranged in tandem and capable of being disposed in front of an object. The second lens group counted from the side of the object includes a front lens group and a rear lens group, and either one of said front and rear lens groups constitutes a vibration correcting lens group movable perpendicularly to the optical axis.

18 Claims, 2 Drawing Sheets

ZOOM LENS HAVING A VIBRATION CORRECTING OPTICAL SYSTEM

BACKGROUND OF THE INVENTION

1. Field of the Invention

The present invention relates to a zoom lens used for an objective lens of a camera and having a function of correcting undesirable displacement of a photographic image on a focal plane due to vibration of the camera.

2. Related Background Art

There have recently been developed various kinds of zoom lenses suited for compact cameras. In particular, such a zoom lens has been proposed that has a function of correcting undesirable displacement of a photographic image occurring by unintentional movement of the operator's hands when photographs are taken.

In general, a vibration correcting mechanism is designed to stabilize an image by moving one or several optical elements of an optical system in directions in which undesirable displacement of the image due to vibration is canceled. In a concrete vibration correcting mechanism, vibration correction can be attained by moving one or several lens groups of a zooming optical system perpendicularly to the optical axis. In such a mechanism, it is demanded that the structure of the lens groups moved for vibration correction be simplified.

For example, the vibration correcting mechanism disclosed in U.S. Pat. No. 5,040,881 has a zooming optical system comprising a first lens group, a zooming lens group and a group including a lens or lenses movable for focusing, arranged in this order as viewed from an object. Part of the first lens group constitutes a vibration correcting lens group and is moved perpendicularly to the optical axis so as to correct displacement of the image when the zooming optical lens system inclines.

Generally, the more corrected are aberrations of a vibration correcting lens group itself, the more is advantageously allowed the amount of vibration. When the vibration correcting lens group is eccentrically moved as a unit, aberrations are retained corrected well during its eccentric movement.

It is preferable, in principle, that the number of each lens group of a zoom lens system be as small as possible so that the zoom lens system has a simple structure. Thus, the lens system including a vibration correcting lens group would be constructed by a possibly smaller number of lenses. However, the number of lenses of the lens group must be increased in order to correct the aberrations of the vibration lens group well. In this case, the aberrations inherent in the lens groups including the vibration correcting groups, i.e., the aberrations allotted to the lens groups when they have been designed, must be properly produced in the lens groups other than the vibration lens groups. Thus, the number of lenses of the other lens groups is increased.

When, in particular, the first lens group is selected for vibration correction in a general photographic zoom lens system comprising three or more lens groups, the first lens group has a positive refracting power and tends to have a relatively large effective diameter. Thus, the lens group itself which must be moved as a unit becomes very heavy. The heavy weight deteriorates the response to the eccentric movement.

With the conventional zoom lens, therefore, it has been extremely difficult to satisfy both the requirements for high focusing ability and high response.

SUMMARY OF THE INVENTION

An object of the present invention is to provide a zoom lens having a vibration correcting lens group, which solves the problems of the prior art and can maintain high focusing ability although the zoom lens is small in size.

In order to achieve the object, a zoom lens having a vibration correcting optical system according to the present invention comprises at least three lens groups, in which an arbitrary N-th lens group which is disposed after the first lens group counted from the side of an object comprises a front lens group and a rear lens group as viewed from the object and either the front lens group or the rear lens group constitutes a vibration correcting lens group movable perpendicularly to the optical axis of the zoom lens.

Preferably the first lens group disposed closest to the object has a positive refractive index and the second lens group includes the vibration lens group.

Assuming that the refracting power of the whole lens group that includes the vibration correcting lens group is $\Phi_N$ and the refracting power of the vibration correcting lens group is $\Phi_V$, it is preferable that the condition $$0.7 \leq |\Phi_V/\Phi_N| \leq 1.3$$

be satisfied.

It is further preferable that $$0 \leq |\beta_N| \leq 2.0$$

be satisfied, where $\beta_N$ is a magnification of the whole lens group that includes the vibration correcting lens group.

In the zoom lens comprising at least three lens groups according to the present invention, an arbitrary N-th lens group which is disposed after the first lens group as counted from the side of an object comprises a front lens group and a rear lens group as viewed from the object and either the front lens group or the rear lens group constitutes a vibration correcting lens group movable perpendicularly to the optical axis of the zoom lens.

Thus, in the above construction the lens group which must be moved eccentrically is made lighter in weight than in the case of the conventional zoom lens whose vibration correcting lens group is provided in the first lens group, and its response is enhanced. Further, the N-th lens group is divided into two sub-groups and one of them constitutes a vibration correcting lens group. The aberrations of the vibration correcting lens group may be corrected well merely by the vibration correcting lens group itself, and the whole N-th lens group may be given inherent aberrations, whereby good focusing ability can be maintained during the eccentric movement.

According to one mode of the present invention, the first lens group disposed closest to the object has a positive refracting power and the second lens group includes the vibration correcting lens group. When the first lens group has a positive refracting power, the second lens group generally tends to have the smallest effective diameter in the whole optical system. Thus, it is advantageous that the second lens group includes the vibration correcting lens group, since the second lens group is the lightest, and the vibration lens group is moved eccentrically at the highest response. Further, since there remains around the second lens group a space for accommodating an element for operating the vibration correcting lens group, such as an actuator for adjusting the vibration correcting lens group. The increase in the diameter of the lens barrel necessitated by the provision of such an element can be kept minimum.

Where the aberrations of the vibration correcting lens group itself are corrected to such an extent that a required amount of eccentric displacement for correcting vibration is allowed and the fundamental aberrations inherent in the N-th lens group that includes the vibration correcting lens group are alloted only to the vibration correcting lens group, the number of lenses forming the vibration lens group itself can be reduced, and the aberrations of the lens sub-groups in the N-th lens group other than the vibration lens group become minimum. In this regard, the N-th lens group can be formed by a small number of lenses.

In one mode, the invention satisfies the following condition:

$$0.7 \leq |\Phi_V/\Phi_N| \leq 1.3 \quad (1)$$

where the refracting power of the lens group that includes the vibration correcting lens group is $\Phi_N$ and the refracting power of the vibration correcting lens group is $\Phi_V$.

The center of the values of the expression (1) is 1 (unity). By making the refracting power of the vibration correcting lens group close to the refracting power of the N-th lens group, the vibration correcting lens itself plays an important role in the N-th lens group. In this connection, the vibration correcting lens group exhibits a substantial part of the aberrations inherent in the N-th lens group that includes the vibration correcting lens group, so that the whole N-th lens group can be constituted by a small number of lenses.

If, on the other hand, $\Phi_V/\Phi_N$ is smaller than the lower limit, the refracting power of the vibration correcting lens group becomes too small, so that displacement of the lens group required for correcting vibration becomes too large. If, on the contrary, $\Phi_V/\Phi_N$ is larger than the upper limit, the refracting power of the vibration correcting lens group becomes too large, and this makes it difficult for only the vibration correcting lens group comprising a small number of lenses to correct the aberrations of the vibration correcting lens group.

Since vibration is corrected by moving the vibration correcting lens group in the direction perpendicular to the optical axis in the zoom lens as described above, undesirable displacement of the lens holder perpendicular to the optical axis due to its play causes an adverse effect on the vibration correction. In one mode of the present invention, this adverse effect is reduced by selecting the following value range of the lateral magnification $\beta_N$ of the lens group that includes the vibration correcting group:

$$0 \leq |\beta_N| \leq 2.0 \quad (2)$$

In other words, the adverse effect on the image quality due to the play of the lens holder can be reduced by rendering small the lateral magnification of the lens group itself that includes the vibration lens group. If, on the other hand, the lateral magnification $\beta_N$ exceeds the upper limit of the expression (2), an adverse effect due to the play of the lens group that includes the vibration correcting lens group appears on the image.

DETAILED DESCRIPTION OF THE PREFERRED EMBODIMENTS

The preferred embodiments of the present invention will be described with reference to the accompanying drawings.

Figure 1:
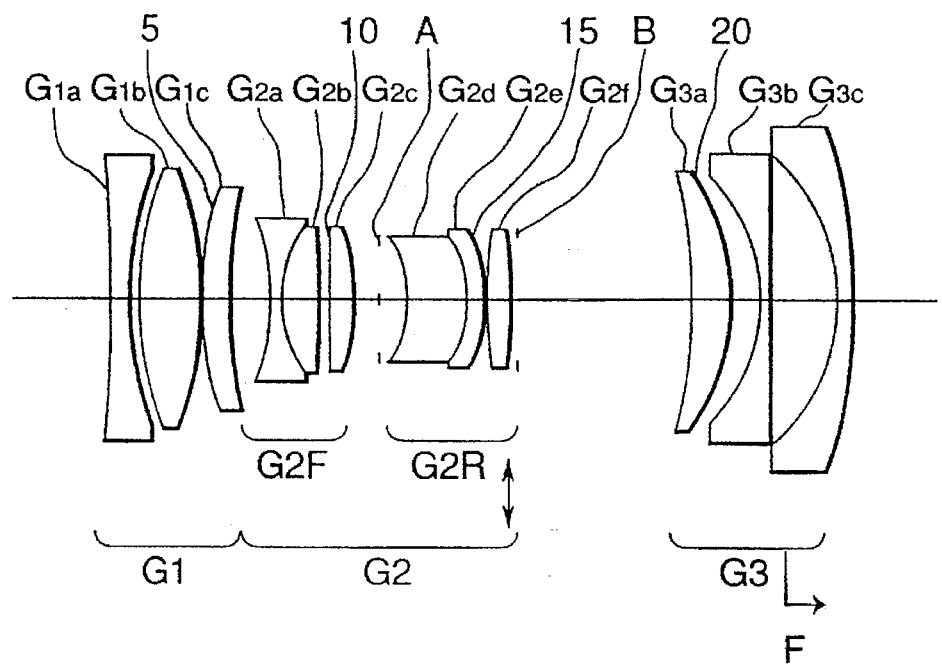
FIG. 1 shows a general structure of a zoom lens according to a first embodiment of the present invention.

FIG. 1 shows a general structure of a zoom lens according to a first embodiment of the present invention. The zoom lens comprises a first lens group G1 having a positive refracting power, a second lens group G2 having a positive refracting power and a third lens group G3 having a negative refracting power, arranged in this order from the object side. In order to perform zooming as viewed from the wide angle end to the telescopic end with this zoom lens, the distance between the first lens group G1 and the second lens group G2 is increased and the distance between the second lens group G2 and the third lens group G3 is decreased. This type of a zoom lens consisting of three lens groups is the minimum photographing zoom lens within the scope of the present invention, and the combination of positive, positive and negative lens groups shortens the whole length of the zoom lens.

The first lens group G1 consists of a double-concave negative lens $G_{1a}$, a double-convex positive lens $G_{1b}$ and a positive meniscus lens $G_{1c}$ having a convex surface directed to the object. The second lens group G2 comprises two subgroups, namely a front lens group G2F and rear lens group G2R. The front lens group G2F consists of a compound lens composed of a double-concave negative lens $G_{2a}$ and a double-convex positive lens $G_{2b}$, and a positive meniscus lens $G_{2c}$ having a concave surface directed to the object. The rear lens group G2R consists of a compound lens composed of a positive meniscus lens $G_{2d}$ having a concave surface directed to the object, a negative meniscus lens $G_{2e}$ having a concave surface directed to the object and a double-convex positive lens $G_{2f}$. The third lens group G3 consists of a positive meniscus lens $G_{3a}$ having a concave surface directed to the object, a negative meniscus lens $G_{3b}$ having a concave surface directed to the object, and a negative meniscus lens $G_{3c}$ having a concave surface directed to the object.

In this embodiment, the focal length f is between 39.00 millimeters and 102.00 millimeters, the F number is between 4.08 and 8.05 and the field angle 2ω is between 57.20° and 23.32°. Table 1 shows the radii of curvature, the lens distances, the Abbe's numbers and the refractive indexes of the lenses numbered from the side of the object, and Table 2 shows the zooming distances of the adjacent lens groups. In FIG. 1, only every fifth lens surface of the zoom lens is numbered (5, 10, 15, and 20) for avoiding complexity in the drawing.

TABLE 1

| Lens Surface Number | Radius of Curvature r (mm) | Distance Between Lenses d (mm) | Abbe's Number $\upsilon$ (d line: $\lambda$ = 587.6 nm) | Refractive Index n (d line: $\lambda$ = 587.6 nm) |
|---|---|---|---|---|
| 1 | −114.155 | 1.50 | 33.9 | 1.80384 |
| 2 | 34.074 | 1.00 | | |
| 3 | 34.383 | 5.30 | 54.0 | 1.61720 |
| 4 | −45.270 | 0.10 | | |
| 5 | 30.065 | 2.60 | 60.1 | 1.62041 |
| 6 | 73.586 | (d 6) | | |
| 7 | −22.875 | 1.10 | 46.5 | 1.80411 |
| 8 | 13.576 | 3.10 | 28.2 | 1.74000 |
| 9 | −88.720 | 0.80 | | |
| 10 | −491.918 | 2.00 | 64.1 | 1.51680 |
| 11 | −19.079 | 2.00 | | |
| 12 | (Aperture Diaphragm) | 2.00 | | |
| 13 | −14.370 | 5.70 | 69.9 | 1.51860 |
| 14 | −9.069 | 1.40 | 23.0 | 1.86074 |
| 15 | −13.774 | 0.10 | | |
| 16 | 70.726 | 2.70 | 69.9 | 1.51860 |
| 17 | −26.349 | (d17) | | |
| 18 | (Fixed Diaphragm) | | | |
| 19 | −47.072 | 3.40 | 27.6 | 1.75520 |
| 20 | −18.922 | 2.20 | | |
| 21 | −17.796 | 1.30 | 43.3 | 1.84042 |
| 22 | −124.763 | 4.00 | | |
| 23 | −16.876 | 1.40 | 55.6 | 1.69680 |
| 24 | −46.779 | (B.f) | | |

TABLE 2

| | Focal Length f (mm) | d6 | d17 | B.f |
|---|---|---|---|---|
| 1 | 38.9998 | 3.2347 | 15.0298 | 8.9728 |
| 2 | 69.9996 | 10.3035 | 7.2691 | 31.0851 |
| 3 | 101.9998 | 17.0677 | 3.1954 | 48.8923 |

In this embodiment, the rear lens group G2R of the second lens group G2 forms a vibration correcting lens group and is designed to be movable perpendicularly to the optical axis. The focal length $f_V$ of the vibration correcting lens group, i.e., the rear lens group G2R is +35.2818 millimeters and the focal length $f_N$ of the whole second lens group G2 is +31.2950 millimeters. Thus, $f_N/f_V$ is 0.887, which satisfies the condition given by Expression (1). Further, the lateral magnification β of the second lens group G2 is between 0.42 and 0.52, which satisfies Expression (2).

Figure 2:
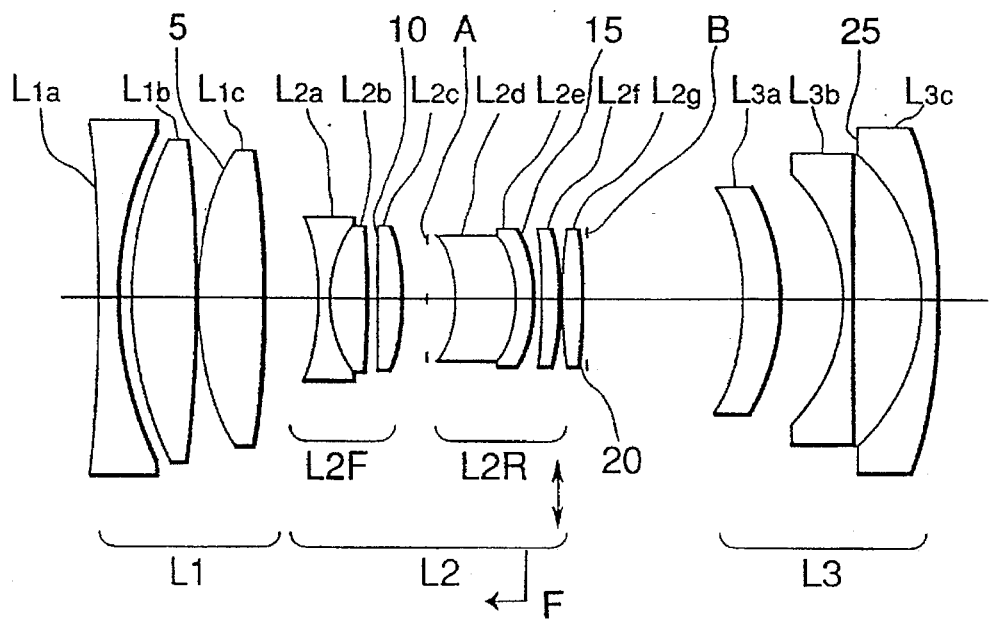
FIG. 2 shows a general structure of a zoom lens according to a second embodiment of the present invention.

FIG. 2 shows a zoom lens according to a second embodiment of the present invention. Similarly to the first embodiment, the zoom lens comprises a first lens group L1 having a positive refracting power, a second lens group L2 having a positive refracting power and a third lens group L3 having a negative refracting power, arranged in this order as viewed from the object side. In order to perform zooming as viewed from the wide angle end to the telescopic end with this zoom lens, the distance between the first lens group L1 and the second lens group L2 is increased and the distance between the second lens group L2 and the third lens group L3 is decreased.

The first lens group L1 consists of a double-concave negative lens $L_{1a}$, a double-convex positive lens $L_{1b}$ and a double-convex positive lens $L_{1c}$. The second lens group L2 comprises two subgroups, namely a front lens group L2F and a rear lens group L2R. The front lens group L2F consists of a compound lens composed of a double-concave negative lens $L_{2a}$ and a double-convex positive lens $L_{2b}$, and a positive meniscus lens $L_{2c}$ having a concave surface directed to the object. The rear lens group L2R consists of a compound lens composed of a positive meniscus lens $L_{2d}$ having a concave surface directed to the object and a negative meniscus lens $L_{2e}$ having a concave surface directed to the object, a positive meniscus lens $L_{2f}$ having a concave surface directed to the object, and a double-convex positive lens $L_{2g}$. The third lens group L3 consists of a positive meniscus lens $L_{3a}$ having a concave surface directed to the object, an approximately plano-concave lens $L_{3b}$ having a concave surface directed to the object and a negative meniscus lens $L_{3c}$ having a concave surface directed to the object.

In this embodiment, the focal length f is between 38.96 millimeters and 101.99 millimeters, the F number is between 3.92 and 8.14 and the field angle 2ω is between 57.32° and 23.49°. Table 3 shows the radii of curvature, the lens distances, the Abbe's numbers and the refractive indexes of the lenses numbered from the side of the object, and Table 4 shows the zooming distances of the lens groups. In FIG. 2, only every fifth lens surface of the zoom lens is numbered (5, 10, 15, 20, and 25) for avoiding complexity in the drawing.

TABLE 3

| Lens Surface Number | Radius of Curvature r (mm) | Distance Between Lenses d (mm) | Abbe's Number υ (d line: λ = 587.6 nm) | Refractive Index n (d line: λ = 587.6 nm) |
| --- | --- | --- | --- | --- |
| 1 | −270.801 | 1.50 | 43.3 | 1.84042 |
| 2 | 27.974 | 1.40 | | |
| 3 | 30.217 | 5.80 | 82.6 | 1.49782 |
| 4 | −120.608 | 0.10 | | |
| 5 | 32.131 | 5.50 | 67.9 | 1.59319 |
| 6 | −94.084 | (d 6) | | |
| 7 | −30.560 | 1.20 | 46.5 | 1.80411 |
| 8 | 15.695 | 3.00 | 27.6 | 1.74077 |
| 9 | −63.482 | 1.40 | | |
| 10 | −74.613 | 1.50 | 65.7 | 1.46450 |
| 11 | −22.711 | 2.00 | | |
| 12 | (Aperture Diaphragm) | 2.00 | | |
| 13 | −13.794 | 5.70 | 82.6 | 1.49782 |
| 14 | −9.913 | 1.40 | 23.8 | 1.84666 |
| 15 | −16.252 | 0.10 | | |
| 16 | −46.718 | 2.00 | 70.4 | 1.48749 |
| 17 | −17.605 | 0.10 | | |
| 18 | 58.479 | 1.70 | 70.4 | 1.48749 |
| 19 | −51.884 | (d19) | | |
| 20 | (Fixed Diaphragm) | | | |
| 21 | −25.121 | 3.00 | 25.4 | 1.80518 |
| 22 | −20.048 | 5.20 | | |
| 23 | −19.167 | 1.30 | 60.0 | 1.64000 |
| 24 | −10668.908 | 5.00 | | |
| 25 | −20.265 | 1.40 | 60.0 | 1.64000 |
| 26 | −42.976 | (B.f) | | |

TABLE 4

| | Focal Length f (mm) | d6 | d19 | B.f |
| --- | --- | --- | --- | --- |
| 1 | 38.9614 | 4.8200 | 13.6289 | 6.7975 |
| 2 | 69.9603 | 12.6413 | 5.8075 | 28.2677 |
| 3 | 101.9946 | 16.3480 | 2.1009 | 49.6732 |

In this embodiment, the rear lens group L2R of the second lens group L2 forms a vibration correcting lens group and is designed to be movable perpendicularly to the optical axis. The focal length $f_V$ of the vibration correcting lens group, i.e., the rear lens group L2R is +34.00666 millimeters and the focal length $f_N$ of the whole second lens group L2 is +31.29532 millimeters. Thus, $f_N/f_V$ is 0.920, which satisfies the condition given by Expression (1). Further, the lateral magnification β of the second lens group L2 is between 0.43 and 0.50, which satisfies Expression (2).

Although, in both the first and second embodiments, the rear lens groups of the second lens groups constitute the vibration correcting lens groups, the present invention is not limited thereto. However, it is preferable that the rear lens group of the second lens group constitute the vibration correcting lens group when the optical system is required to be compact.

Generally, the incident ray height of the principal rays entering the second lens group varies greatly in the optical system during zooming operation, and the aberrations are likely to be changed greatly in the front lens group during the zooming operation. It is accordingly difficult to make the front lens group a vibration correcting lens group which exhibits small aberration changes and comprises a small number of lenses. This is the reason why the front lens group is not recommended to be used as a vibration correcting lens group. On the other hand, the incident ray height of the principal rays entering the third lens group does not change so much, and the aberrations in the rear lens group do not change so much. Thus, by making the rear lens group a vibration correcting lens group, the vibration correcting lens group can be formed by a small number of lens with small aberration changes.

In the first and second embodiments, an aperture diaphragm A is provided between the front lens group and the rear lens group which forms the vibration correcting lens group. The use of a shutter unit also employed as a diaphragm makes a-presently commercialized compact camera small. It is preferred that the shutter unit occupy the smallest space in the lens holder. Thus, it is preferable that the diaphragm be disposed between the front lens group of the second lens group which has the smallest effective diameter and the rear lens group which is the vibration correcting lens group and be integrally formed with a vibration correcting actuator which drives the vibration correcting lens group.

Figure 3:
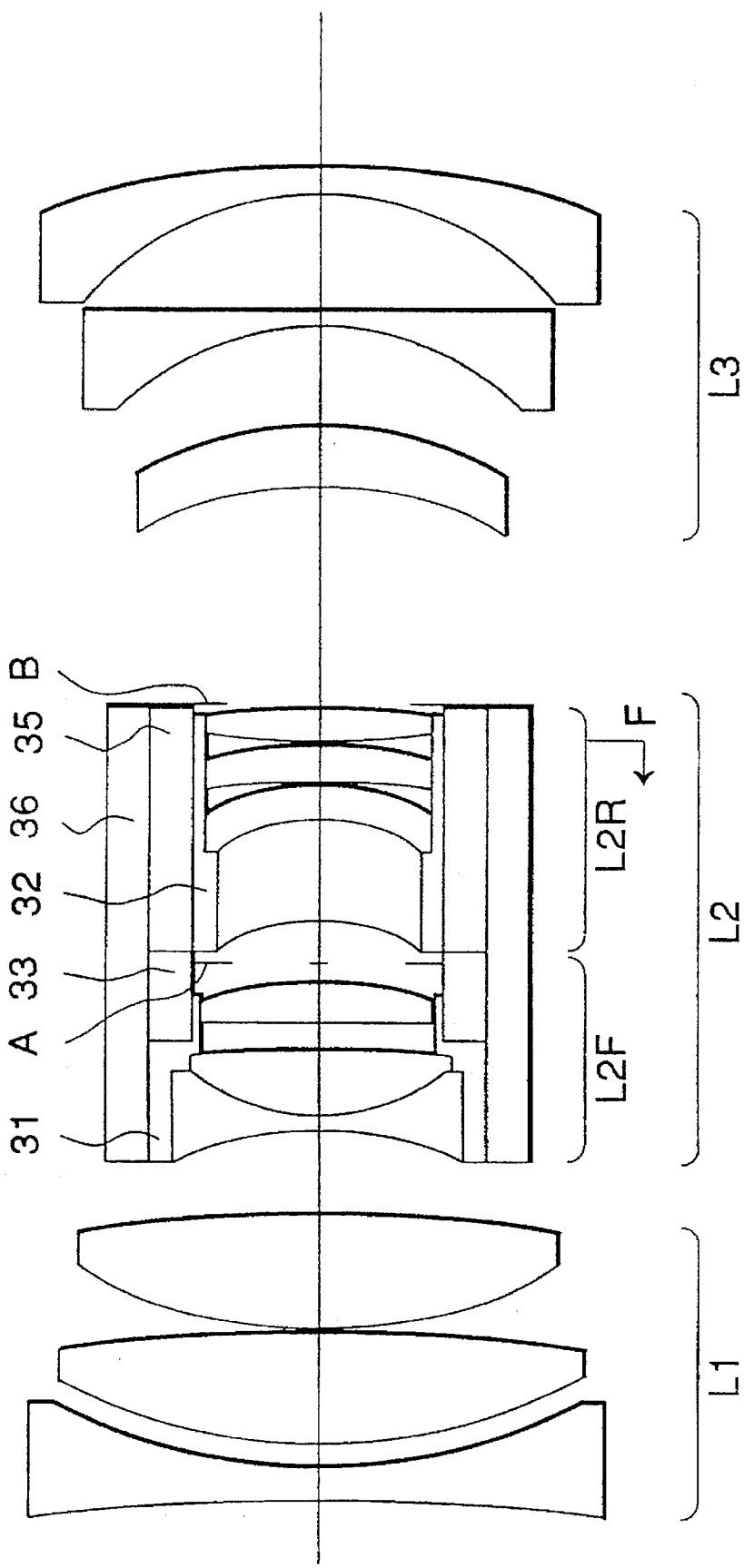
FIG. 3 shows a general structure of an embodiment of a vibration correcting actuator according to the present invention.

Such an aperture diaphragm A is shown in FIG. 3. A lens holder 31 holds the front lens group L2F of a second lens group L2, and another lens holder 32 holds the rear lens group L2R. The rear lens group L2R is moved together with the lens holder 32 perpendicularly to the optical axis, whereby vibration is corrected. Reference numeral 33 designates a shutter unit which is also used as a diaphragm. An aperture diaphragm A is formed in the shutter unit 33. The shutter unit 33 and a vibration correcting actuator 35 are held integrally by a member 36, on which a fixed diaphragm B is formed.

The fixed diaphragm B is securely provided at the opposite position to that of the aperture diaphragm A with the vibration correcting lens group between. The fixed diaphragm B is fixed with regard to the direction perpendicular to the optical axis. The effective diameter of the vibration correcting group is more increased by the amount of displacement for vibration correction than the normal effective diameter, and coma-flare is generated on the image when the size of the light bundle having a wide field angle is determined by the effective diameter of the vibration correcting lens group. The fixed diaphragm B is used to limit the coma-flare.

With a single meniscus-shaped lens having a concave surface directed to the aperture diaphragm, both the spherical aberration and the astigmatism can be corrected well. In order to form a vibration correcting lens group by a small number of lenses, therefore, it is advantageous that the surface of the vibration lens group closest to the aperture diaphragm is made concave.

It is preferable that the vibration correcting lens group comprise at one least positive lens and at least one negative lens so as to correct the chromatic aberration merely by a vibration correcting lens group. In case where the first lens group has a positive refracting power and the second lens group includes a vibration correcting lens group, like the embodiments described above, it is advantageous that the front lens group of the second lens group has a negative refracting power and the rear lens group of the second lens group has a positive refracting power so as to correct coma that appears in the lower portion of a picture frame.

It is suitable to carry out a focusing operation from infinity to the closest position by moving the third lens group toward the image in the first and second embodiments, because the changes of the image characteristics and the change of the focus are small (see, e.g., G3 in FIG. 1). With a slight modification, however, such a focusing operation can be performed by moving only the whole second lens group (see, e.g., L2 in FIG. 2) or only the rear lens group of the second lens group (see, e.g., L2R in FIG. 3) toward the object. It is apparent that a filter or a lens group having 10% of the refracting power of the N-th lens group may be provided just in front of or just after the vibration correcting lens group. The lens group or filter provided just in front of or just after the vibration correcting lens group may be fixed with respect to a direction perpendicular to the optical axis upon vibration correction and may satisfy a condition:

$$0 \leq |\Phi_{add}/\Phi_N| \leq 0.1$$

where $\Phi_{add}$ is a refracting power of the fixed lens group or fixed filter (in which case $\Phi_{add}$ is equal to zero) and $\Phi_N$ is a refracting power of the N-th lens group.

As described above, with the present invention, the eccentric driving response of the vibration correcting lens group is, as compared with the prior art, more improved in a state in which a high focusing property is maintained. The space occupied by a shutter unit also used as a diaphragm or a vibration correcting actuator in the lens holder can be minimized. This structure provides a zoom lens having a vibration correcting optical system suited for a compact camera.

What is claimed is:
1. A zoom lens having an optical axis and comprising, from an object side:
   a first lens group closest to an object having a positive refracting power;
   a first variable air space;
   a second lens group including a front lens group and a rear lens group, and only one of said front and rear lens groups constitutes a vibration correcting lens group movable perpendicularly to said optical axis;
   a second variable air space; and
   a third lens group;
   wherein zooming from a wide angle end to a telephoto end is performed by changing said first variable air space and said second variable air space, and a condition

$$0.7 \leq |\Phi_V/\Phi_2| \leq 1.3$$

is satisfied, where $\Phi_2$ is a refracting power of the whole second lens group and $\Phi_V$ is a refracting power of said vibration correcting lens group.

2. A zoom lens according to claim 1, wherein a condition $$0 \leq |\beta_N| \leq 2.0$$

is satisfied, where $\beta_N$ is a magnification of said second lens group.

3. A zoom lens according to claim 2, wherein said vibration correcting lens group comprises at least one positive lens and at least one negative lens.

4. A zoom lens according to claim 2, wherein said front lens group of said second lens group has a negative refracting power and said rear lens group of said second lens group has a positive refracting power.

5. A zoom lens according to claim 2, wherein the third lens group is movable in the direction of said optical axis for focusing.

6. A zoom lens according to claim 2, wherein said second lens group is movable in the direction of said optical axis for focusing.

7. A zoom lens according to claim 2, wherein said rear lens group of said second lens group is movable in the direction of said optical axis for focusing.

8. A zoom lens according to claim 1, wherein said vibration correcting lens group comprises at least one positive lens and at least one negative lens.

9. A zoom lens according to claim 1, wherein said front lens group of said second lens group has a negative refracting power and said rear lens group of said second lens group has a positive refracting power.

10. A zoom lens having an optical axis and comprising, from an object side:
    a first lens group closest to an object having a positive refracting power;
    a first variable air space;
    a second lens group having a positive refracting power, including a front lens group and a rear lens group, and only one of said front and rear lens groups constitutes a vibration correcting lens group movable perpendicularly to said optical axis;
    a second variable air space; and
    a third lens group,
    wherein zooming from a wide angle end to a telephoto end is performed by changing said first variable air space and said second variable air space, and a condition $$0.7 \leq |\Phi_V/\Phi_2| \leq 1.3$$

is satisfied, where $\Phi_2$ is a refracting power of the whole second lens group and $\Phi_V$ is a refracting power of said vibration correcting lens group.

11. A zoom lens according to claim 10, wherein a condition $$0 \leq |\beta_N| \leq 2.0$$

is satisfied, where $\beta_N$ is a magnification of said second lens group.

12. A zoom lens according to claim 11, wherein said vibration correcting lens group includes at least one positive lens and at least one negative lens.

13. A zoom lens according to claim 11, wherein said front lens group of said second lens group has a negative refracting power and said rear lens group of said second lens group has a positive refracting power.

14. A zoom lens according to claim 11, wherein the third lens group is movable in the direction of said optical axis for focusing.

15. A zoom lens according to claim 11, wherein said second lens group is movable in the direction of said optical axis for focusing.

16. A zoom lens according to claim 11, wherein said rear lens group of said second lens group is movable in the direction of said optical axis for focusing.

17. A zoom lens according to claim 10, wherein said vibration correcting lens group comprises at least one positive lens and at least one negative lens.

18. A zoom lens according to claim 10, wherein said front lens group of said second lens group has a negative refracting power and said rear lens group of said second lens group has a positive refracting power.

* * * * *